United States Patent

[11] 3,612,772

[72] Inventors Claude Paul Henri Lerouge
Maurepas;
Jean Perrault, Port-Marly, both of France

[21] Appl. No. 843,875
[22] Filed Apr. 9, 1969
[45] Patented Oct. 12, 1971
[73] Assignee International Standard Electric Corporation
New York, N.Y.
[32] Priority Apr. 11, 1968
[33] France
[31] 147 879

[54] CIRCUIT FOR ADDING CODES RESULTING FROM NONLINEAR CODING
6 Claims, 9 Drawing Figs.

[52] U.S. Cl. .......... 179/18 BC
[51] Int. Cl. .......... H04m 3/56
[50] Field of Search .......... 179/1 CN, 18 BC, 15 AT

[56] References Cited
UNITED STATES PATENTS

| | | | |
|---|---|---|---|
| 3,387,095 | 6/1968 | Miller et al. | 179/18 .01 |
| 3,399,275 | 8/1968 | Niertit et al. | 179/1 CN |
| 3,508,007 | 4/1970 | Goodall et al. | 179/15 A |
| 3,495,041 | 2/1970 | Gaunt et al. | 179/18 BC |
| 3,530,246 | 9/1970 | Kelly et al. | 179/1 CN |
| 3,551,600 | 12/1970 | Berch | 179/18 BC |

*Primary Examiner*—Kathleen H. Claffy
*Assistant Examiner*—David L. Stewart
*Attorneys*—C. Cornell Remsen, Jr., Walter J. Baum, Percy P. Lantzy, J. Warren Whitesel, Delbert P. Warner and James B. Raden

ABSTRACT: A PCM circuit adds the speech codes of subscribers who are participating in a conference call. A decoding circuit decodes two PCM codes, and the resulting analog voltages are added together. The sum of the analog voltages are reencoded and sent out to the other subscribers.

CIRCUIT FOR ADDING CODES RESULTING FROM NONLINEAR CODING

Figure 1:
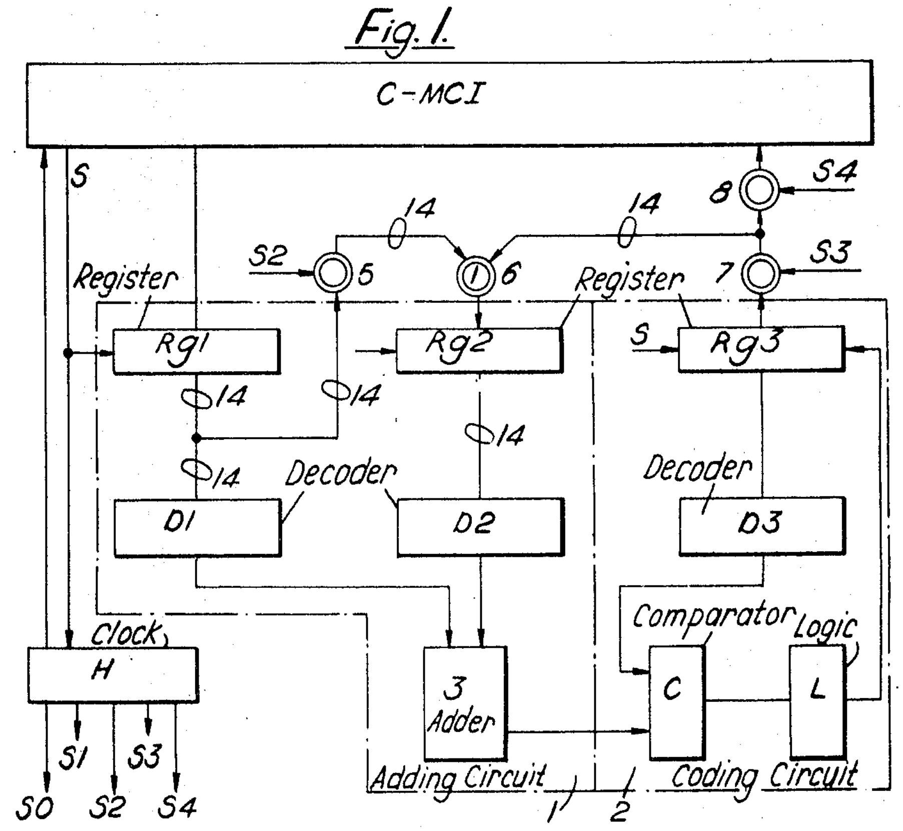

The present invention concerns an enabling circuit to add binary numbers resulting from coding of nonlinear speech signals from subscribers participating to a conference.

Certain switching systems enable the setting up of a conference between several subscribers; these systems are often called "conference" circuits. All of the telephone sets participating in a conference generally have the same possibilities, i.e., each subscriber may hear all the others, and all the others may hear him. In classical telephony, a conference circuit usually comprises multiple-winding transformers through which the voice power is from any given telephone set equally distributed between all of the other telephone sets. If N is the number of sets connected in the conference circuit, the unavoidable minimum attenuation is equal to $10\log_{10}(N-1)$ decibels.

We can design conference circuits in which voice signals are transmitted, in time succession, in the form of numbers expressed in binary code. In such conference circuits, using pulse code modulation (PCM system) each speech signal is sampled and each sample is converted into a binary code with $n$ digit time slots. In the simplest case, where only three subscribers are in conference, the addition of two speech codes from any two different subscribers gives rise to a third code which is transmitted to the third subscriber. The received code is decoded, in the set of this third subscriber, and the resulting signal contains the components related to the two signals which are mixed to obtain the additional codes. This addition is repeated for each of two subscribers, and the sum code is transmitted to the third subscriber. Thus, all speech information is transmitted and switched in the form of binary codes.

A conference circuit using the pulse code modulation system may be divided in three distinctive parts. A first part comprises the coding and decoding circuits of the speech signals. A second part carries out the addition of the codes. A third part switches the codes in order that each subscriber may receive the information intended for him. Since the coding of the samples is not generally linear, it is not possible to directly carry out the addition of two codes.

An object of the present invention is to achieve a circuit for adding codes resulting from the nonlinear coding of speech signals from the subscribers who are participating in a conference.

Another object of the present invention is a code-adding circuit for elaborating the speech codes intended for the various subscribers participating to a conference.

According to a feature of the present invention, a circuit for adding speech codes comprises a device for decoding two codes. The analog voltages supplied by the decoding device are added, and a coding device encodes the sum of these two analog voltages. Electronic gates switch the decoding device, on the one hand, to receive the codes to be added, and on the other hand, to receive the codes supplied by the coding device. A clock circuit supplies the control signals for the coding device and the electronic gates.

According to another feature of the present invention, the coding device is a feedback coder, comprising a decoder having a ladder attenuator which is common to the two decoders of the decoding device.

According to another feature of the present invention, if $n$ is the maximum number of subscribers which may participate to a conference, the codes of the $n$ subscribers are introduced in the decoding device according to a sequence comprising $(n-1)$ times the group of $n$ codes ranged in the same order.

According to another feature of the present invention, when the $n1$ number of subscribers which participate to a conference is lower than the maximum number $n$, the codes are introduced in the same sequence, but $(n-n1)$ codes of the group of $n$ codes are constituted by zero digits.

Figure 4:
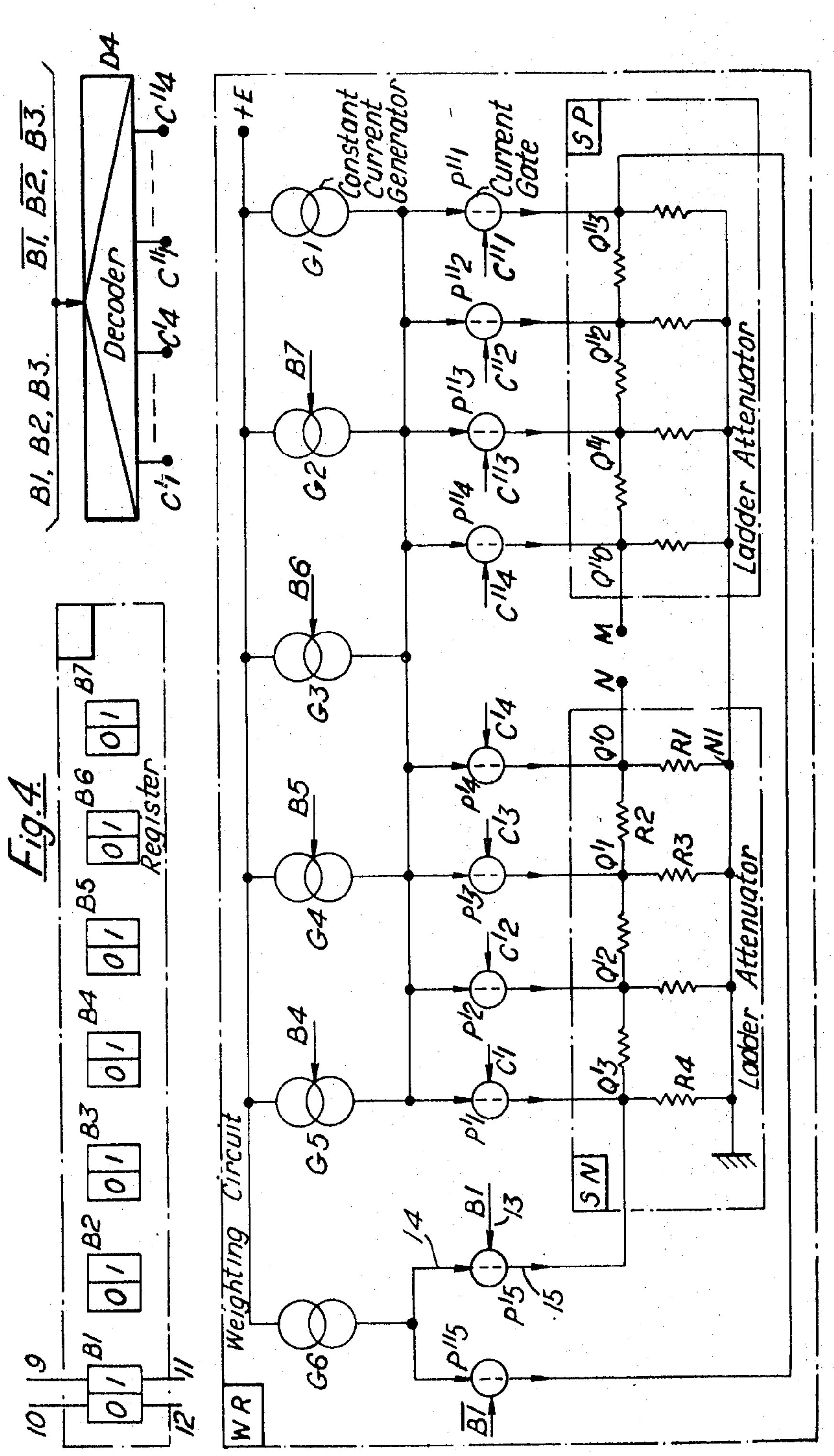
Figure 5:
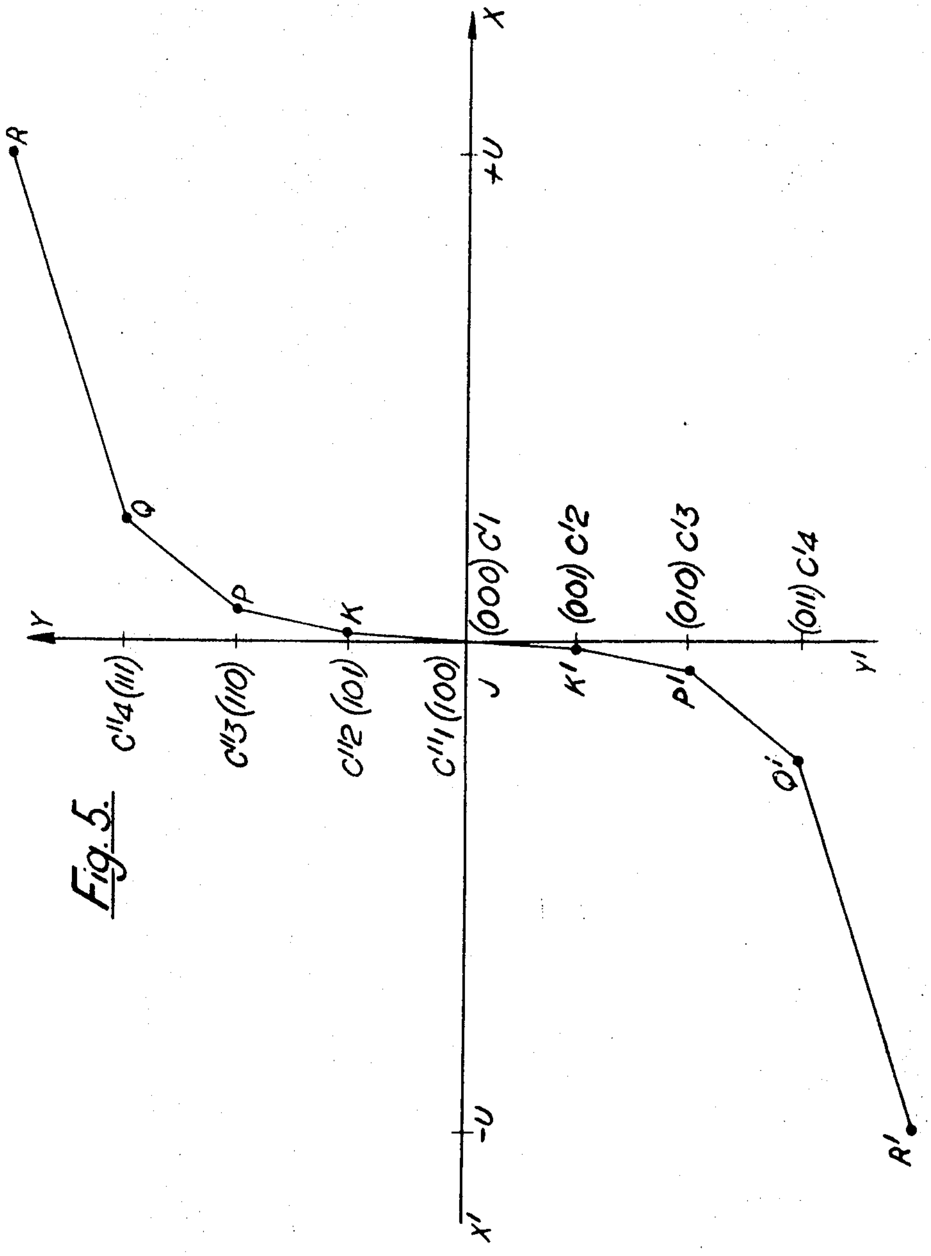

The above-mentioned and other features and objects of this invention will become apparent by reference to the following description taken in conjunction with the accompanying drawings in which:

FIG. 1 represents a circuit for adding speech codes from subscribers participating in a conference;

FIGS. 2$a$ and 2$b$ represent the diagrams of the signals required for the coding and for the introduction of the codes;

FIGS. 3$a$ to 3$d$ represent the diagrams of the signals required for the operation of the circuit of FIG. 1;

FIG. 4 represents one of the preferred embodiments of the decoders D1, D2 and D3 of FIG. 1; and FIG. 5 represents the characteristic curve of the decoder of FIG. 4.

Before describing the invention, we shall briefly discuss the logic algebra notations which are used herein to simplify the description of the logic operations. The subject has been treated extensively in numerous papers and in particular in the book "Logical Design of Digital Computers" by M. Phister (J. Wiley—publisher).

Thus, if a condition characterized by the presence of a signal is written A, the condition characterized by the absence of the said signal will be written $\overline{A}$.

These two conditions are linked by the well-known logical relation $A\times\overline{A}=0$, in which the sign "×" is the symbol of the coincidence logic function or "AND" function.

If a condition C appears only when conditions $A$ and $B$ are simultaneously present, one writes $A\times B=C$, and this function may be carried out by means of a coincidence or AND circuit.

If a condition $C$ appears when at least one of two conditions E and F is present, one writes $E+F=C$, and this function is carried out by means of a mixing gate or OR circuit.

Since these AND and OR logic functions are commutative, associative and distributive, one may write:

$A+B=B+A$;

$A\times(B+C)=A\times B+A\times C$;

$(A+B)(C+D)=A\times C+A\times D+B\times C+B\times D$; etc...

Lastly, a function of two variables A and B may present four possible combinations. If one writes $A\times B$, the three other combinations are globally represented by the expression $\overline{A\times B}$.

If one characterizes condition $A$ by digit 1 and condition $\overline{A}$ by digit 0, condition $B$ by digit 1 and condition $\overline{B}$ by digit 0, the combination $A\times B$ can be written 11, the combination $\overline{A}\times B$ can be written 01, etc...

FIG. 1 represents the diagram of a circuit for adding the speech codes derived from subscribers who are participating to a conference.

In this FIG. 1, a symbol 5 comprises two concentric circles which represent 14 AND circuits connected in parallel. All of these AND gates are controlled by the same one signal, S2 in this particular case. This circuit is called a multiple AND circuit. An AND circuit, or coincidence electronic gate, supplies a positive signal on its output when its inputs simultaneously receive positive signals. If $A$ and $B$ designate the signals which are present on each one of the two inputs, the circuit achieves the logical condition which is noted $A\times B$.

The symbol 6 comprises a digit 1 surrounded by two concentric circles which represent 14 OR circuits connected in parallel. An OR circuit, or mixing electronic gate, supplies a positive signal on its output when a positive signal is applied to at least one of its inputs. If $C$ and $D$ designate the signals which are present on each one of its two inputs, this circuit achieves the logical condition $C+D$.

The circuit of FIG. 1 comprises mainly a circuit 1 for adding two codes and a circuit 2 for encoding the two analog voltages which are representative of the sum of the two codes. The adding circuit 1 comprises the registers Rg1 and Rg2, the decoders D1 and D2, and a circuit 3 for adding the two analog voltages supplied by the decoders D1 and D2.

The coding circuit 2 is a feedback coder. It comprises a register Rg3, a decoder D3, a comparator C for comparing the voltage supplied by the circuit 3 and the voltage supplied by the decoder D3. A logic circuit L receives the signal resulting from the comparison and supplies a control signal to the flip-flops of the register Rg3.

Feedback coding involves a comparison between the analog value of a number written in a register (Rg3) and the signal which is to be coded (signal supplied by the circuit 3.) This comparison is determination of whether the number in register Rg3 is too big or too small. If it is too big, the number is reduced; if it is too small, it is increased. These comparison operations are carried on up to the time where the compared voltages differ, at most, by the value of one quantizing step. The decoder D3 transforms the number written in the register Rg3 into an analog value.

When the decoder is nonlinear, the coding is carried out according to a nonlinear characteristic curve. Since the same decoder may be used for both encoding and decoding, the companding characteristic of the coding device and the expanding characteristics of the decoding device are perfectly complementary, if the decoder has stable and reproducible characteristics. Since the companding and expanding characteristics are the same for all the subscribers in a PCM telephone system, the decoders D1, D2 and D3 of FIG. 1 may be identical.

Assume, by way of example, that six subscribers are to be linked in a single conference call by using the circuit of FIG. 1. This number six is not limitative, but is selected here because it corresponds to the usual possibilities of a conference circuit in classical telephony. The capital letters A, B, C, D, E, F, designate the subscribers in the conference call, and the lower case letters *a, b, c, d, e, f* represent their speech codes appearing during a sampling period T.

The PCM codes received by a central exchange, reference C–MCI, are in a series form. However, the codes are transmitted inside the exchange in a parallel form. Since the received codes cannot be immediately directed toward the subscriber to which they are intended, the codes are stored in memories in their parallel form, and they are read in a parallel form at the suitable moment.

For the requirements of the present invention, the PCM exchange must have an additional memory constituted by six registers, in the particular example described. The six speech codes *a, b, c, d, e, f* of the six subscribers A, B, C, D, E, F participating to a conference are stored in the six registers. These six codes correspond to a sampling period T, and it will be assumed that they are available in the registers during a sampling period T. During the course of one period T, these registers are read cyclically in order to supply the group of codes *a, b, c, d, e, f* five times which gives the sequence: *abcdefabcdefabcdefabcdefabcdef*, which are 30 successive codes. Therefore, the reading pulses of the registers must have a period *r* which, at most, is equal to T/30. In order to carry out a cyclic reading, these reading pulses *r* are applied, for instance, to a ring counter comprising six stages, the output signals of which control the reading of the six registers.

Figures 2A, 2B, 3A, 3B, 3C, 3D:
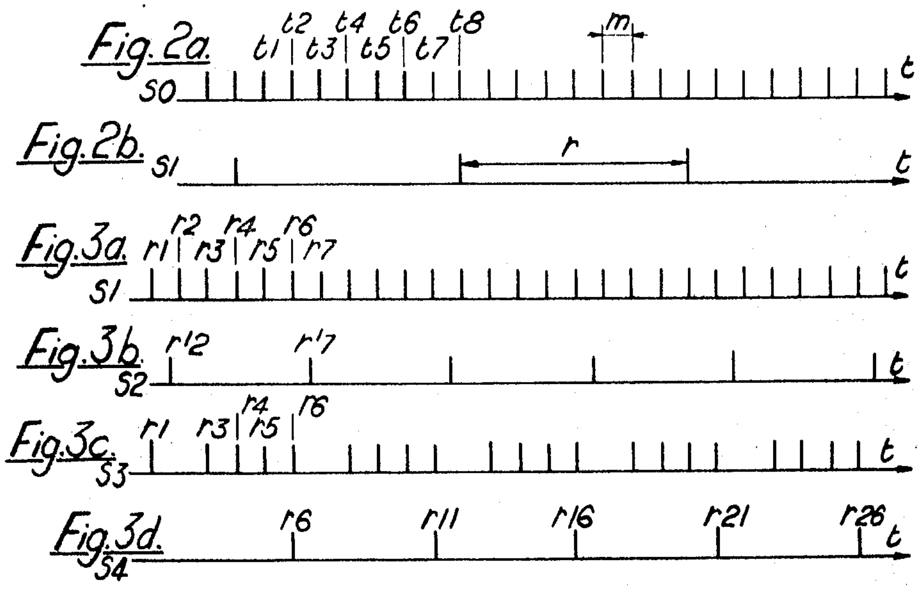

This assembly of circuits comprising the six registers and the ring counter are not represented on FIG. 1. It is assumed that these circuits are part of the PCM central exchange and are included in the clock circuit H which supplies the pulses of period *r*. These pulses, referenced S1, are represented by the diagram of FIG. 2*b*. The pulses required for the feedback coding circuit 2 must have a period m which is equal, at most, to *r*/8 if the speech codes have seven digits. These feedback pulses, referenced SO, are represented by the diagram of FIG. 2*a*. It is clear that the clock circuit H elaborates first the pulses of the signal SO and that the pulses of the signal S1 are obtained by dividing the pulses of the signal SO by eight.

The signals SO and S1 of the FIGS. 2*a* and 2*b* are supplied to the logical circuit L in order to enable it to carry out the various switching operations during coding.

FIGS. 3*b* to 3*d* represent respectively the diagrams of the signals S2, S3 and S4; elaborated by the clock circuit H responsive to the signal S1 of FIG. 2*b*. Thus, the signals S2, S3, S4 are a separation of the pulses shown on FIG. 3*a*, according to another time scale. The signal S2 (FIG. 3*b*) is constituted by a series of pulses of period 5*r*, the first one of which *r*'2 corresponds to the pulse *r*2 of the signal S1, but it is slightly in advance of pulse *r*2. The signal S4 (FIG. 3*d*) is also constituted by a series of pulses of period 5*r*, the first one of which corresponds to the pulse *r*6 of the signal S1. Last, the signal S3 (FIG. 3*c*) is constituted by the signal S1 from which the pulses *r*2, *r*7, *r*12...i.e. have been removed to provide a period 5*r* starting from the pulse *r*2.

The operation of the circuit of FIG. 1 is described by means of the diagrams of signals of FIGS. 3*a* to 3*d* and the following table. These represent the codes appearing in the three registers Rg1, Rg2 and Rg3 and at the output of the multiple AND circuit 8. These codes occur as the pulses *r*1 to *r*9 of the signal S1 appear. As far as the register Rg3 is concerned a code resulting from the coding is displayed in the time interval separating the pulses *t*7 and *t*8 from the signal SO.

| Time | r1 | r2 | r3 | r4 | r5 | r6 | r7 | r8 | r9 |
|---|---|---|---|---|---|---|---|---|---|
| Rg1 | a | b | c | d | e | f | a | b | c |
| Rg2 | 0 | a | a+b | a+b+c | a+b+c+d | a+b+c+d+e | f | f+a | f+a+b |
| Rg3 | a | a+b | a+b+c | a+b+c+d | a+b+c+d+e | a+b+c+d+e+f | | f+a | f+a+b |
| Output | | | | | | | | | |

The code-adding circuit of FIG. 1 does not operate when a conference is not required. This adding is blocked when the signals supplied by the clock circuit H are not distributed.

When a conference call is required, the six first codes *a, b, c, d, e, f* are stored in this order in the six registers. The PCM central exchange supplies a signal S which deblocks the clock circuit H, resets the registers Rg1, Rg2 and Rg3, and sets the ring counter. Thereafter, the first pulse *r*1, of the signal S1, causes a readout of the first one of six registers, i.e. the one containing the code *a*. This code *a* is transferred to the register Rg1 through a multiple OR circuit (not shown) connected to the output of the six registers.

The analog voltage which is to be encoded is supplied by the decoder D1, and it is representative of the code *a*. At this time, the output voltage of the decoder D2 is nil; therefore, the register Rg2 is displaying only zero digits. The successive comparisons of the coding are carried out at a rate which is set by the pulses *t*1 to *t*7 of the signal SO of FIG. 2*a*. Hence, the code *a* is stored in the register Rg3 before the arrival of the pulse *r*'2 of the signal S2. This pulse *r*'2 transfers the code *a* from the register Rg1 to the register Rg2 through a multiple AND circuit 5 and through the OR circuit 6. Afterward, the pulse *r*2 of the signal S1 causes a transfer of the code *b* of the central PCM exchange to the register Rg1.

The two codes *a* and *b* are decoded in the decoders D1 and D2. Then, their corresponding analog voltages are added in a circuit 3. The sum of these two codes is then reencoded and the new code is stored in the register Rg3 where it represents the sum (*a*+*b*). This new code (*a*+*b*) is transferred into the register Rg2 and through the multiple AND circuit 7 under the control of the pulse *r*3 in the signal S3. At the same time, a new code *c* is stored in the register Rg1.

The operations are carried on in the same way until the occurrence of the pulse *r*6 of the signal S4. Responsive thereto, the representative code of *a*+*b*+*c*+*d*+*e*) is transferred from the register Rg3 to the PCM central exchange through the multiple AND circuit 8. This code (*a*+*b*+*c*+*d*+*e*) is intended for the sixth subscriber (F) engaged in the conference call. This code (*a*+*b*+*c*+*d*+*e*) is also transferred in the register Rg2 responsive to the pulse *r*6 of the signal S3, so that the code (*a*+*b*+*c*+*d*+*ef*) appears in the register Rg3. By using the pulse *r*'7 of the signal S2, the code f is transferred from the register Rg1 to the register Rg2 where it replaces the code (*a*+*b*+*c*+*d*+*e*). The pulse *r*7 of the signal S1 transfers the code *a* from the PCM central exchange to the register Rg1, so that the code stored in the register Rg3 is (*f*+*a*).

When the pulses *r*6, *r*11, *r*16, *r*21, *r*26 and *r*31 of the signal S4 are applied to the multiple AND circuit 8, the codes (*a*+*b* +*c*+*d*+*e*), (*f*+*a*+*b*+*c*+*d*), (*e*+*f*+*a*+*b*+*c*), (*d*+*e*+*f*+*a*+*b*), (*c*+*d* +*e*+*f*+*a*) and (*b*+*c*+*d*+*e*+*f*), respectively, are sent out to the PCM central exchange. These codes are intended for the six subscribers F, E, D, C, B, A, respectively, who are using the conference call equipment. Since the first code, transferred at the beginning of the sequence, is always contained in the first one of the six registers, the order of the codes contained in the first one of the six registers, the order of the codes contained in the registers is given by an inversion of the order of the addresses of the successive codes appearing at the output of the multiple AND circuit 8.

The pulse the r31 of the signal S4, which enabled the transfer of the last code ($b$+$c$+$d$+$e$+$f$) toward the PCM central exchange, is also used for blocking THE clock circuit H. As it has been seen previously, this clock circuit H is deblocked by the signal S after six new codes $a, b, c, d, e, f$ are stored in the six registers.

Thus, the coder 2 can operate correctly only if the register Rg3 is reset before each coding operation.

The code, resulting from the addition, is really the sum of the ($n$−1) codes only if the sum of the ($n$−1) analog voltages is lower than the maximum voltage which can be coded. This limitation is generally observed, since only one subscriber in a conference call speaks at a time. The others usually remain quiet so that the permissible dynamic range is not exceeded. Statistical studies show, and experience confirms, that 50 percent of all the speech signals have an amplitude lower than 3 percent of the maximum amplitude; therefore, a high probability exists that a sum of two subscribers' speech signals will not exceed the maximum voltage that can be coded.

The circuit of FIG. 1 has been provided and described for six subscribers in conference. If there are less than six subscribers, the codes of the subscribers who do not participate to the conference are sent out as zero digits. Thus, if four subscribers A, B, C and D are in conference, the sequence of the codes in the register Rg1 will be: *abcdooabcdooabcdooabcdooabcdoo*, (the codes *o* indicating codes which comprise only zero digits). At the output of the multiple AND circuit 8, the codes which appear at the times *r6* and ***r*11** must not be taken into account by the PCM central exchange.

The circuit of FIG. 1 may also be used for more than six subscribers if the frequency of the pulses of the signal SO is modified according to the number of registers in the PCM central exchange, and the number of stages of the ring counter. This increase of frequency is, however, limited by the response time of the decoders D1, D2 and D3.

Usually, the decoders of the circuit of FIG. 1, comprise a ladder attenuator supplied by current generators which are, in turn, controlled by logical signals obtained from the digits of the code. Since the companding characteristic of the coding device 2 and expanding characteristic of the decoding device 1 are the same, the decoders D1, D2 and D3 are identical insofar as the ladder attenuators are concerned. This ladder attenuator may be common to all the decoder circuits D1, D2 and D3. It constitutes the circuit 3 for adding the analog voltages representative of the codes contained in the registers Rg1 and Rg2. It may also be in a circuit for subtracting the analog voltages representative of the sum of the codes contained in the registers Rg1 and Rg2 and of the code contained in the register Rg3.

FIG. 4 represents a preferred embodiment of a decoder. In this FIG. 4, the symbol P'5 represents an electronic gate which is activated by a signal B1 applied to its input 13. This enables a transmission of an amplitude signal applied to its main input 14, through gate P'5, and out over the output conductor 15.

A symbol such as the one referenced B1 designates a flip-flop controlled by a signal on one of its input terminals 9 or 10 in order to shift it respectively to the 1 state or to the 0 state. An output voltage, having the same polarity as the control signals, is present on the output terminal 11 when the flip-flop is in the 1 state. This same polarity appears at the output terminal 12 when this side of the flip-flop is in the 0 state. The logical condition that the flip-flop is in the 1 state will be written B1, the one characterizing the 0 state will be written $\overline{\mathbf{B1}}$.

The symbol referenced RG designates a register comprising seven flip-flops referenced B1 to B7. These flip-flops are assigned to different digits of the PCM code. The more significant digit is the one stored in the flip-flop B1. The references ***b*1, *b*2, *b*3, *b*4, *b*5, *b*6 and *b*7 designate the different digits of the code respectively displayed by the flip-flops B1, B2, B3, B4, B5, B6 and B7**.

A symbol D4 represents a decoder circuit which transforms a three-digit binary code applied by the group of six conductors coming out of flip-flops B1, B2 and B3 of the register RG into a code of the type "one out of eight." For example, a positive signal appears on only one single conductor among the eight output conductors C'1 to C'4 and C''1 to C''4 for each one of the codes stored in the flip-flops B1, B2 and B3 of the register RG.

A symbol G2 represents a current generator which delivers a constant current of amplitude $I_2$ into an impedance having a value which is very low with respect to the internal impedance of the generator. This generator is started by the application of a control signal B7 supplied by the flip-flop B7.

A decoder similar to that of FIG. 4 has been described in the U.S. Pat. application Ser. No. 686,072 filed Nov. 28, 1967 (A. Y. LeMaout—C.P.H. Lerouge 3—6) and U.S. Pat. application Ser. No. 698,312 filed Jan. 16, 1968 (C.P.H. Lerouge—D. C. Strube 8-3). In the first patent, the characteristic curve of the decoder was a multilinear curve with 13 segments. In the second patent, the characteristic curve was a continuous logarithmic curve. The decoder briefly described herein has the multilinear characteristic curve that is represented by FIG. 5. This curve is obtained from the logarithmic law expressed by the equation:

$$y=\frac{\log\ (kx+1)}{\log\ (k+1)} \qquad (1)$$

in which equation:

- the two logarithms have the same base,
- $x$ is the amplitude ratio of the signal to be companded to the maximum positive amplitude +U admitted at the input of the compandor circuit,
- $y$ is the homologous ratio for the companded signal, and
- $k$ is the companding parameter.

This curve passes through the origin J of the axis X'X and Y'Y and through the various points K, P, Q, R, K', P', Q', R' which are the points 1/4, 2/4, 3/4, 1, −1/4, −2/4, −3/4, −1, on the respective ordinates of the curve. By linking together these various points, and the origin J, we obtain the multilinear curve of FIG. 5.

For instance, the axis of the ordinates Y'JY is here divided into 108 equal levels, and a seven-digit code is assigned to each level. These codes are such that the more significant digit determines the polarity of the voltage. The six other digits, according to the normal binary scale, determine the amplitude of the voltage on both sides of the zero voltage level. This method of coding is called "symmetric coding."

FIG. 5 lists on the axis Y'JY, only a few codes formed by the three more significant digits ***b*1, *b*2, *b*3, the other digits being zeros. These particular codes have been referenced C'1 to C'4 for the negative amplitudes, and C''1 to C''4** for the positive amplitudes.

To obtain an analog voltage which is a function of a code (i.e. $x$ in terms of $y$), the equation (1) will be written: $kx+1=(k+1)^y$: or the equation may also be written:

$$255x+1=256^{1/64(32b2+16b3+8b4+4b5+2b6+b7)} \qquad (2)$$

by taking $k$=255, and by writing the variable $y$ under the form $$y=\frac{b2}{2}+\frac{b3}{4}+\frac{b4}{8}+\frac{b5}{16}+\frac{b6}{32}+\frac{b7}{64}$$

the digits $b2$ to $b7$ have the decimal value 0 or 1, and they determine the amplitude of the analog voltage. The formula (2) leads to the equation of the multilinear curve which is written:

$$255x+1=(4)^{2b2+b3}[1+3/16(8b4+4b5+2b6+b7+0.5)] \qquad (3)$$

which may also be written under the form $255x=R.\ T-1(4)$ by setting $$R=(4)^{2b2+b3}$$

and $$T=1+\tfrac{3}{16}(8b4+4b5+2b6+b7+0.5.$$

With respect to the equation (2), the constant term 0.5 has been added. This corresponds to the middle of two graduations, on the axis Y'JY.

The decoder of FIG. 4 comprises a register RG having the flip-flops B1 to B7 for the storing of the codes comprising seven digits b1 to b7 the binary-decimal decoding circuit D4, the weighting circuit WR which supplies, between the terminals M and N, a voltage characterizing the value of the code stored in the register RG.

The weighting circuit WR comprises two ladder attenuators SN and SP. The ladder attenuator SN is connected to the current generators G1 to G6 through electronic gates P'1 to P'5. The ladder attenuator SP is connected through the electronic gates P''1 to P''5. The currents $I_1$ to $I_5$ are supplied respectively by the current generators G1 to G5. Taken together, these currents represent the term $T$ of the equation (4), and they have the respective values.

$$I\left(1+\frac{3}{32}\right),\ \frac{3I}{16},\ \frac{3I}{8},\ \frac{3I}{4},\ \frac{3I}{2}$$

These values correspond to the terms between brackets of the equation (3). The generator G1 continuously supplies a current $$I_1=I(1+3/32).$$

The choice of either one or the other of the generators G2 to G5 is made responsive to the signals state of the flip-flops B7, B6, B5 and B4 of the register RG.

The term $R$ of the equation (4) is obtained by one of the ladder attenuators SN or SP, each cell of which brings in an attenuation coefficient of 4. With such an attenuation coefficient a current I injected at a point Q'0 of the ladder network SN causes a voltage V to appear between the point N and the point N1. If one shifts the current injection point toward the left of the figure, the voltage V decreases by a ratio 4 for each shift. It is thus seen that, the attenuation ratio is a negative power of four, the exponent of which is given by the reference digit at the point of injection. Thus, a current injected at the point Q'2 produces a voltage attenuated by a ratio $4^{-2}=1/16$ (with respect to the same current injected at the point Q'0).

The product $R{\cdot}T$ is obtained by injecting the currents supplied by the signals G1 to G5 in a point of one of the ladder attenuators. The choice of the injection point is made by the electronic gates P'1 to P'4 and P''1 to P''4 which are, in turn, controlled respectively by the signals C'1 to C'4 and C ''1 to C ''4 resulting from the decoding of the three most significant digits *b1*, *b2* and *b3*. In this decoding, the most significant digit *b1* determines the ladder attenuator in which the current will be injected.

The term −1 is obtained by the current generator G6 supplying a current $I_6=I$ which is switched over toward the point Q''3 or the point Q'3 through the electronic gates P''5 and P'5, controlled respectively by the state signals B1 and B1 of the flip-flop B1.

The ladder attenuators SN and SP are identical. The values of the resistors R2 and R3 of each cell are determined in relation to the value R of the resistor R1 and the attenuation coefficient $g=4$, which is to be obtained for each cell. Thus, the resistor $$R2=(g-1),\ R=3R \text{ and } R3=\frac{gR}{g-1}=\frac{4R}{3}$$

The end resistor R4 has the value $R$.

As previously stated, the ladder attenuator may be common to the three decoders D1, D2 and D3. Therefore, to carry out a subtraction between the sum of the codes contained in the registers Rg1 and Rg2 and the code contained in the register Rg3, the connections between the current generator of the decoder D3 and the ladder attenuator are reversed with respect to those shown of FIG. 4. Thus, for subtraction, the electronic gates P'1 to P'4 are connected respectively to the points Q''3 to Q''0 of the ladder attenuator SP, and the electronic gates P''1 to P''4 are connected respectively to the points Q'3 to Q'0 of the ladder attenuator SN. The electronic gates P'5 and P''5 are connected, respectively, to the points Q''3 and Q'3. In the decoder of a coder, the current generator G1 of the decoder D3 must supply only a current $I_1=I$, the constant term $I/32$ corresponding to the coefficient 0.5 of the equation (3) not being necessary.

When decoders of symmetrical codes such as that of FIG. 4 are used in the circuit of FIG. 1 and when the codes *a b c d e f* are not symmetrical codes, it is obvious that provision must be made for a transcoding circuit in order to present the speech codes under a symmetrical form. A transcoding circuit carrying out the reverse operation must also be provided for between the register Rg3 and the PCM central exchange. Such transcoding circuits known otherwise will not be described.

While the principles of the above invention have been described in connection with specific embodiments and particular modifications thereof, it is to be clearly understood that this description is made by way of example and not as a limitation of the scope of the invention.

What we claim is:

1. A circuit for adding signals in PCM code resulting from nonlinear coding comprising: decoding means for converting two code words into analog signals provided by said decoding means, coding means for encoding the sum of said analog voltages, means for transferring a third code word and the encoded sum into said decoding means, gating means for sending out from said coding means a code word which represents the sum of codes, and clock means for providing signals for controlling the coding means and said transferring means and said gating means.

2. An adder circuit according to claim 1 and at least one ladder attenuator said decoding means comprising current generators for supplying said ladder attenuator, and said coding means is a feedback coder, said ladder attenuator being common to said decoding and coding means.

3. A circuit for adding speech signals in PCM code from subscribers who are participating in a conference call connection comprising: means for decoding first and second PCM code words including respective first and second decoders, means for adding the analog voltages resulting from the first and second decoders, means for encoding the sum of the voltages, electronic gate means for selectively coupling the encoding means to said conference connection and to said second decoder, and means comprising a clock circuit for supplying control signals to the electronic gate means.

4. The circuit of claim 3 and a feedback coder having ladder attenuator means, the ladder means being common to two decoders of the decoding means.

5. The circuit of claim 4 wherein the number of subscribers participating in the conference call is equal to a maximum number *n*, each represented by an address comprising part of a code word, and wherein there are means for introducing code words in the decoding circuit means according to a sequence comprising the group of *n* code words ranged in the same order, each word including (*n*−1) addresses.

6. The circuit of claim 5, wherein the number *n*1 of subscribers participating in a conference is less than the maximum *n* for which the conference call circuit is designed, and the means for introducing the sequence of the addresses in code words is in an order which is identical to the order for *n* subscribers except that (*n*−*n*1) addresses of the group of *n* code words are constituted by zero digits.